March 11, 1941. K. PRINZ 2,234,274
ELECTRODE FEEDING MECHANISM FOR ARC LAMPS
Filed April 26, 1939 2 Sheets-Sheet 1
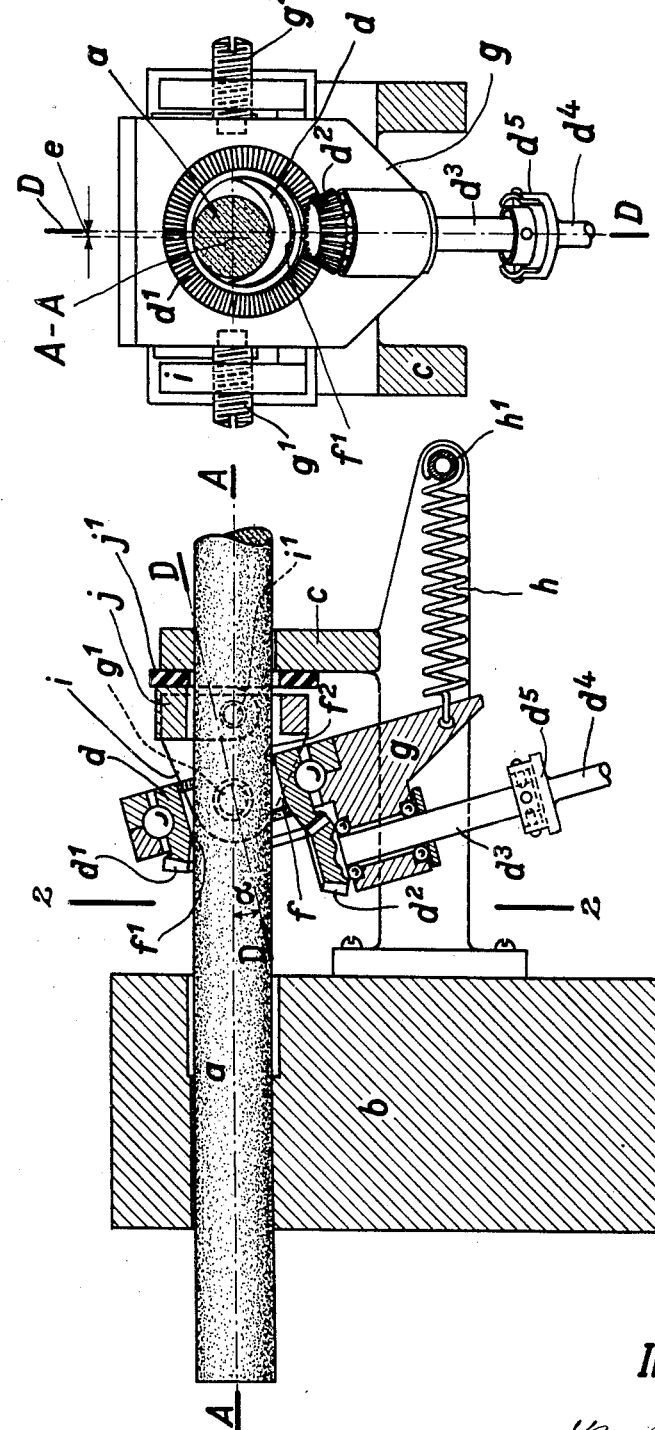
Inventor:
Karl Prinz

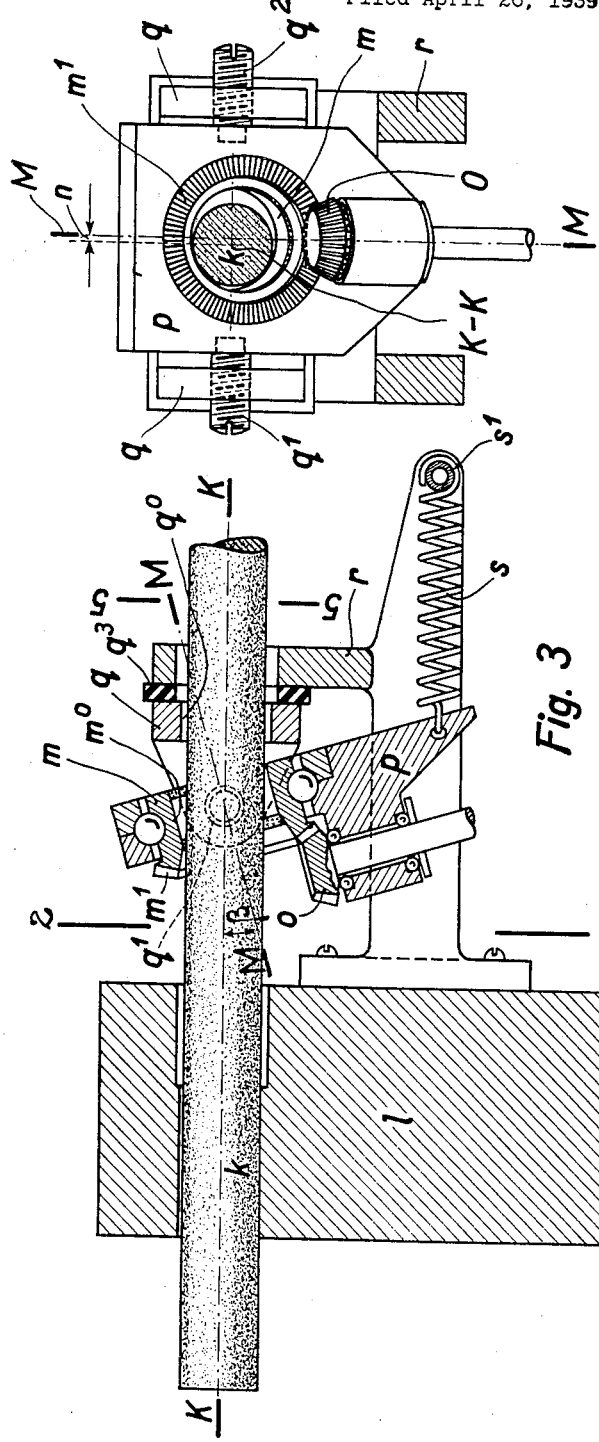
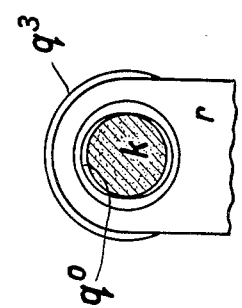

Patented Mar. 11, 1941

2,234,274

UNITED STATES PATENT OFFICE 2,234,274

ELECTRODE FEEDING MECHANISM FOR ARC LAMPS

Karl Prinz, Jena, Germany, assignor to the firm of Carl Zeiss, Jena, Germany

Application April 26, 1939, Serial No. 270,149
In Germany May 2, 1938

5 Claims. (Cl. 176—55)

This invention relates to electrode feeding mechanisms for arc lamps and is an improvement in or modification of the invention set forth in specification No. 2,136,082. According to this specification, an annular wheel whose axis crosses that of the electrode at an acute angle surrounds the electrode and is in direct operative connection therewith, so that a rotation of the said wheel imparts to the electrode a helical turning motion, viz. both a rotation about and a displacement along the axis of the electrode. The annular wheel permits the use of an especially simple mechanism of comparatively small dimensions. In the mechanism described in the parent specification, the annular wheel is mounted on the electrode, between two guide bearings carrying the electrode, and drawn at right angles against the electrode by means of a spring. The force exerted on the electrode by the hollow wheel produces forces in the guide bearings amounting in total to the same strength as the force exerted by the hollow wheel, and the movement of the electrodes is exposed in these bearings to a comparatively great frictional resistance, the magnitude of which depends on the bearing forces. To overcome the said resistance, the interior surface of the annular wheel has been provided with pins or teeth, which are slightly pressed into the electrode and thus ensure sufficient tangential forces for the rotation of the electrode. Sometimes, however, these comparatively strong impressions are not in favour of a uniform and reliable feed.

The present invention aims at improving the action of the annular wheel by providing that this wheel touches the electrode with the two rims of its interior surface and that the said rims are kept in contact with the electrode for instance by a spring acting on the wheel.

By this arrangement the wheel exerts upon the electrode a couple of forces tending to rotate the electrode about an axis intersecting the axis of the electrode at a right angle. On their part, the guide bearings for the electrodes thereby exert upon the latter a balancing couple of forces which are in equilibrium with the first. The forces themselves, of which those of the first couple determine the extent of the desired friction between electrode and wheel, whilst those of the latter couple determine the extent of the undesired friction between electrode and guide. By giving the guide bearings and the annular wheel a corresponding distance apart, the frictional forces in the bearing can be reduced to such an extent that the annular wheel can feed the electrode easily and reliably. Friction due to smooth surfaces will as a rule suffice in this case. If, however, the reliability of the feed is desired to be increased further, it is advantageous to slightly roughen the wheel surfaces in contact with the electrode.

The speed of the electrode feed depends on the eccentricity of the annular wheel relative to the electrode, viz. on the distance apart of the axis of the wheel and that of the electrode. It is convenient, accordingly, to provide that this distance can be changed, so that the speed of the electrode feed is adjustable.

With a view to guiding the electrode in two bearings enveloping its entire circumference, it is advantageous to provide that the bearing body of the wheel can be tilted about an axis which is parallel to the plane containing the wheel and crosses or intersects the axis of the electrode at right angles, so that the electrode cannot jam in the guides.

The annular wheel can be coupled to the driving motor in different manners. A simple coupling is obtained by providing the annular wheel itself with bevel gear teeth connected to the driving motor through the agency of intermediate gearings.

It is further advantageous to interpose bad electric conductors between the head of the electrode holder of the lamp, which supplies the electric current to the electrodes, and the bearing of the annular wheel, and to thus prevent current from flowing through the annular wheel to the electrode and a consequent damaging of the surface with which the annular wheel is in contact with the electrode.

In the accompanying drawings, which illustrate two mechanisms according to the invention, Fig. 1 shows a section through the axis of the electrode of the one mechanism, and Fig. 2 a section through line 2—2 in Fig. 1; Fig. 3 represents a section through the axis of the electrode of the other mechanism, and Fig. 4 a section through line 4—4 in Fig. 3; and Fig. 5 is a view of a part of the said other mechanism.

The constructional example according to Figs. 1 and 2 concerns the feed of a carbon electrode $a$ guided in an electrode head $b$. The electrode is guided also in a bearing pedestal $c$ screwed to the head $b$. The feed of the electrode is effected by an annular wheel $d$, the axis D—D of which crosses the axis A—A of the electrode $a$ at an angle $\alpha$ at a distance $e$ from the electrode axis A—A (Fig. 2). The slightly roughened rims $f^1$ and $f^2$ of the interior surface of the wheel $d$, which has teeth $d^1$, being in contact with the electrode $a$. The teeth $d^1$ engage a bevel gear $d^2$ which is mounted together with the wheel $d$ in a body $g$. This body $g$ is rotatable about pins $g^1$ and $g^2$. A spring $h$ fast with the body $g$ and, by means of an insulating sleeve $h^1$, with the pedestal $c$, holds the wheel $d$ permanently in contact with the electrode $a$. As the electrode $a$ is completely supported by the bearings $b$ and $c$, the body $g$ of the wheel $d$ is displaceable, viz. jointed to a body $j$ fixed by means of an insulating body $j^1$ to the pedestal $c$. To change the eccentricity of the wheel $d$ relatively to the electrode $a$, viz. the distance $e$, pins $g^1$ and $g^2$ are adjustably screwed into the fork $i$, so that this fork can be adjusted laterally. The shaft $d^3$ of the bevel gear $d^2$ is connected to the shaft $d^4$ of a driving motor by means of a universal joint $d^5$ and can, accordingly, adapt itself to the variations of the bearing $g$.

The forces with which the wheel $d$ acts on the electrode $a$ by means of the spring $h$ entail a turning moment about the axis of the pins $g^1$ and $g^2$, and the reacting forces the bearings $b$ and $c$ cause to act on the electrode $a$, which entail a friction working against the movement of the electrode $a$, are the smaller the greater the distances of these bearings from the axis of the pins $g^1$ and $g^2$.

In the constructional example illustrated by Figs. 3 to 5, a carbon electrode $k$ is to be both displaced and rotated by an electrode head $l$. This displacement and rotation is effected by an annular wheel $m$ rotatable about an axis M—M crossing the electrode axis, designated K—K, at an angle $\beta$ at a distance $n$. The wheel $m$, which has teeth $m^1$ in mesh with a bevel gear $o$, is mounted in a body $p$. This body is rotatable about stationary pins $q^1$ and $q^2$ in a bearing pedestal $q$ fixed by means of an insulating body $q^3$ to a lateral arm $r$ of the electrode head $l$. By means of a spring $s$ fixed to the bearing $p$, the wheel $m$ is held in the position shown in the drawings, in which the rims of its interior surface $m^0$ touch the electrode $k$. In this case, also the wheel $m$ serves for guiding the electrode $k$ in the plane at right angles to the axis of the pins $q^1$ and $q^2$. Guiding in this direction is effected as well as by a bore $q_0$ (Fig. 5). The spring $s$ is fixed to the arm $r$ by means of an insulating sleeve $s^1$, which prevents current from flowing from the driving wheel $m$ to the electrode $k$. With a view to changing the eccentricity of the driving wheel $m$ relatively to the electrode $k$, the pins $q^1$ and $q^2$ are screwed into the fork $q$ in such a manner that they can be slightly adjusted sidewardly.

According to the sense of the rotation of the annular wheel, the electrode is displaced fore or backwardly.

As will be seen, there is a difference between the arrangement shown in Figs. 1 and 2 and that shown in Figs. 3 to 5, in that in the first the electrode is supported in two bearings ($b$ and $c$), whilst in the latter it is supported in one bearing ($l$) and by the annular wheel ($m$), the latter arrangement affording the possibility of supporting the bearing body ($p$) by stationary pins ($q^1$ and $q^2$).

I claim:

1. In an arc lamp, a holder for an electrode, a feeding mechanism for said electrode, said feeding mechanism having an annular wheel provided with a central orifice containing said electrode, said annular wheel feeding said electrode through said holder, the said annular wheel being eccentric to the axis of said electrode, and the axis of said annular wheel crossing said axis at an acute angle, a bearing body for said annular wheel, said bearing body being mounted for rotation about an axis intersecting the axis of said annular wheel and the axis of said electrode at right angles, a spring fixed to said bearing body and to said electrode holder to effect a rotation of said bearing body about the axis of rotation of same and to maintain the contact of the two edges of the interior surface of said annular wheel with said electrode.

2. In an arc lamp, a holder for an electrode, a feeding mechanism for said electrode, said feeding mechanism having an annular wheel provided with a central orifice containing said electrode, said annular wheel feeding said electrode through said holder, the said annular wheel being eccentric to the axis of said electrode, and the axis of said annular wheel crossing said axis at an acute angle, a bearing body for said annular wheel, said bearing body being mounted for rotation about an axis intersecting the axis of said annular wheel and the axis of said electrode at right angles, a spring fixed to said bearing body and to said electrode holder to effect a rotation of said bearing body about the axis of rotation of same and to maintain the contact of the two edges of the interior surface of said annular wheel with said electrode, adjusting means for displacement of said body along the axis of rotation of same.

3. In an arc lamp according to claim 1, a holder for said bearing body being pivoted to said electrode holder for rotation about an axis parallel to the axis of rotation of said bearing body.

4. In an arc lamp according to claim 1, bevel gear teeth on said annular wheel, a driving shaft for said annular wheel, and a bevel gear fast with said shaft and in mesh with said bevel gear teeth.

5. In an arc lamp according to claim 1, said bearing body being electrically insulated from said electrode holder.

KARL PRINZ.